UNITED STATES PATENT OFFICE.

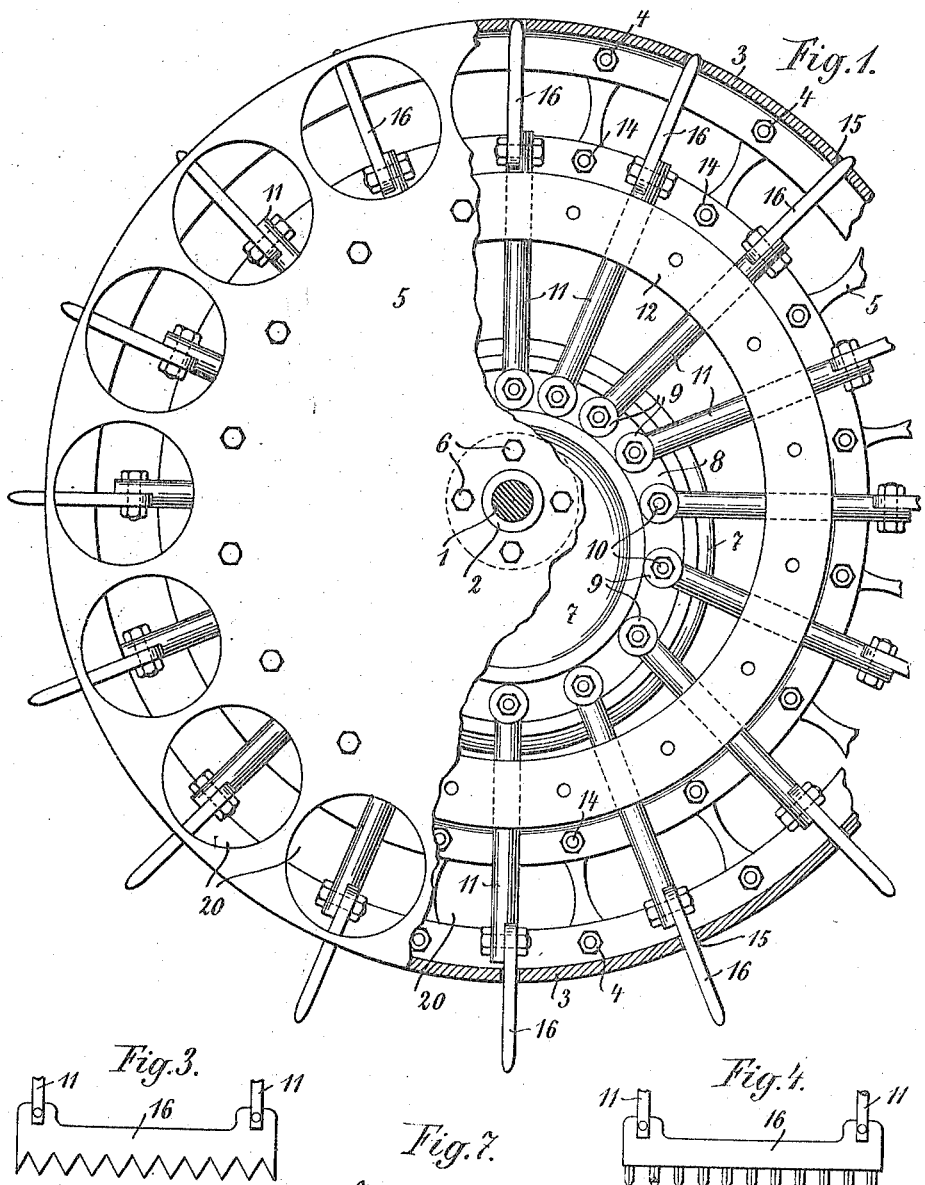

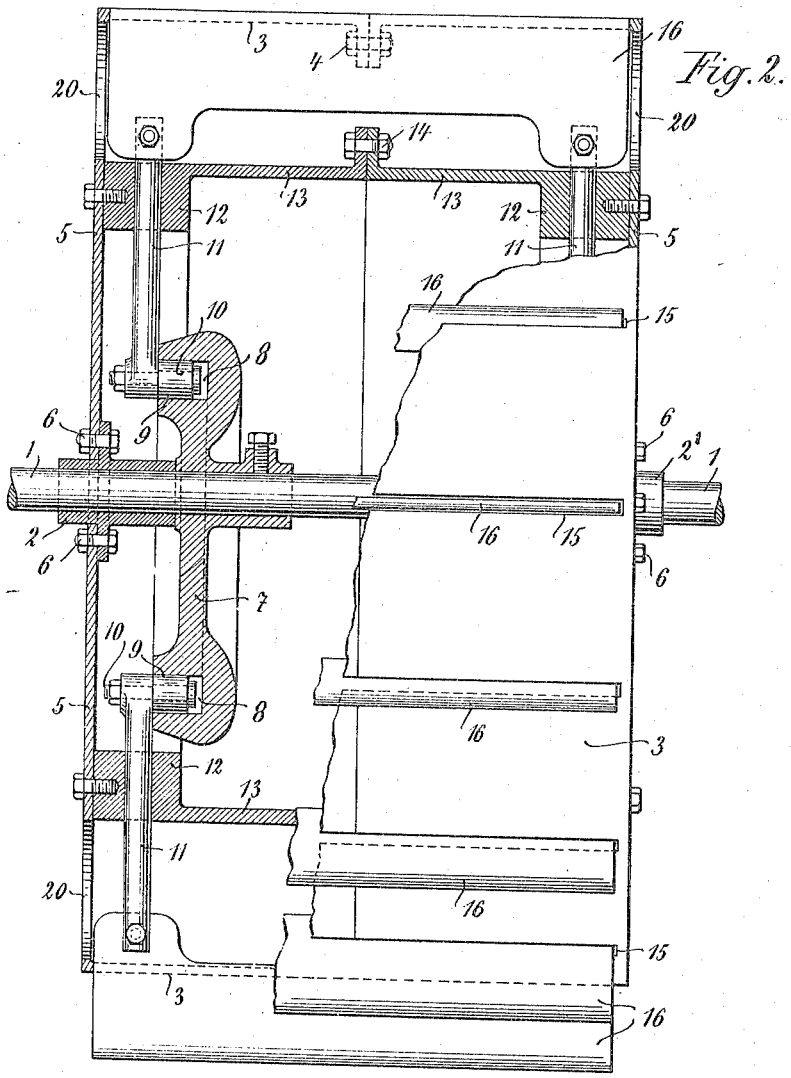

HENRY HALLAM, OF PARIS, FRANCE.

DRIVING-WHEEL FOR MECHANICAL TRACTORS.

1,284,097.  Specification of Letters Patent.  Patented Nov. 5, 1918.

Application filed May 15, 1916. Serial No. 97,634.

*To all whom it may concern:*

Be it known that I, HENRY HALLAM, a subject of the King of Great Britain and Ireland, residing at No. 31 Rue de Lisbonne, Paris, France, have invented certain new and useful Improvements in Driving-Wheels for Mechanical Tractors, of which the following is a specification.

Mechanical tractors, more particularly for agricultural purposes, have already been proposed, the wheels of which for the purpose of getting a better grip on the ground, are provided instead of fixed teeth, with mechanically actuated teeth that project from the wheel rim and are withdrawn thereinto at the proper moment.

The present invention has now for its object to provide an improved wheel of this type. This improved wheel has numerous advantages both constructional and functional.

In the improved wheel both the means for operating the teeth, and the teeth themselves, are adapted to be mounted and also removed in a very easy manner.

The rubbing parts are protected from dust and are inclosed in a tight box filled with lubricant whereby friction is reduced to a minimum.

The improved wheel also comprises mechanism for effecting the penetration of the teeth into the ground under the best conditions.

This invention will now be more particularly described with reference to the accompanying drawings in which:—

Figure 1 is a side elevation partly in section of one form of the improved wheel.

Fig. 2 is a cross section partly in end elevation of the same.

Figs. 3, 4, 5 and 6 illustrate details.

Fig. 7 is a side elevation illustrating the means for fixing the eccentric in any desired adjusted position.

In the example, 1 is the axle of the wheel; it serves also as the shaft for actuating the hereinafter described mechanism for pushing out and drawing in the ground-gripping teeth through the rim of the wheel. 2 and 2' are the wheel hubs mounted on the axle 1. Secured to the hubs, by means of bolts 6, are side plates 5, which are provided with peripheral flanges forming the rim 3 of the wheel. These flanges terminate in centrally extending rings, which are secured together by bolts 4.

The axle 1 has fixed on it inside the wheel close to each hub, an eccentric 7 formed with an annular groove 8 in which antifriction rollers 9 are arranged to work. These rollers 9 are journaled on pins 10 carried by operating rods 11 which slide with slight friction in the thick flange 12 of a ring 13 that is concentric to the wheel rim 3. This ring 13, like the rim 3, is made in two halves fastened together by bolts 14.

The wheel rim 3 has slots 15 each of which serves for the passage of a ground-gripping tooth 16. Each tooth 16 is fastened right and left at its ends by means of bolts or other fastenings to the outer ends of the operating rods 11 located at the two sides of the wheel.

As shown in Fig. 2, the teeth 16 have the form of wide plates, but they may be made of other forms according to the nature of the soil. For instance in the case of hard soil, it is preferred to make each tooth serrated as shown in Fig. 3, or in the form of a rake having preferably triangular teeth which will penetrate readily into the soil, as shown in Fig. 4.

In a modification each tooth is mounted in a fork on the end of its operating rod as shown in Fig. 5, and is guided at its ends on the inner sides of its slot 15 in side guides 17 removably attached to the cover plates 5, 5, as shown in Fig. 6. This arrangement is designed to allow a certain amount of freedom of movement of the teeth, while preventing any "play" of the operating rods 11 in their guides in the flanges 12.

The eccentricity of the eccentric 7 being directed toward the ground, it will be understood that as the wheel rotates, the teeth 16 will be caused by the action of their operating rods actuated by the eccentrics 7, 7, to protrude one after the other through the slots 15 so as to penetrate into the soil, and then to be withdrawn again into the said slots.

For the purpose of altering the direction of the eccentricity of the eccentrics, and consequently altering the depth of penetration of the teeth into the soil, the eccentrics are rotated by means of the device illustrated in Fig. 7. This device comprises a controlling lever 18 mounted on one end of the axle 1. This lever is provided with a spring catch engaging with the notches of a sector 19. By turning the lever 18, the axle 1 and consequently also the eccentrics 7 are caused to rotate.

It is to be understood that any other adjusting mechanism may be used instead of that shown in Fig. 7.

The holes formed in the thick flanges 12 of the ring 13 for the passage of the operating rods 11, may be fitted or packed in such a manner as to form a tight joint for the cylindrical box constituted by the ring 13 and the side cover plates 5, 5. This box may be filled with lubricant and consequently all the rubbing parts will be constantly lubricated without the necessity of lubricating the same from the outside.

20 are openings in the side cover plates 5, 5 for the purpose of allowing of dismounting the teeth 16, and also of observing the operation of the latter without it being necessary to unfasten any other part of the wheel.

What I claim is:—

1. A traction wheel including side plates spaced apart and provided with oppositely disposed flanges forming the rim of the wheel, a ring located between said side plates, arranged concentric with the rim and provided with a series of pairs of alined radially disposed guides, radially movable members carried by said guides, means for operating the last named members as the wheel rotates, and ground engaging means secured to said members and movable through said rim.

2. A traction wheel including side plates provided with oppositely disposed peripheral flanges forming the rim of the wheel and spacing the plates apart, means detachably securing said flanges together, a ring located between the side plates and arranged concentric with said rim, means detachably securing said side plates and ring, radially movable members arranged at each side of said ring and guided thereby, and ground engaging plates movable through the rim and connected to said members, each plate being connected to two members.

3. In a traction wheel, a ring provided at each side with guiding means, radially movable rods supported by said means, ground engaging plates detachably secured to said rods, each plate being secured to two rods, and means for moving said rods.

4. A traction wheel comprising hubs, side plates connected with the hubs and provided with oppositely disposed peripheral flanges forming the rim of the wheel and spacing the side plates apart, means detachably connecting said flanges together, a ring located between said side plates and arranged concentric with the flanges, means detachably securing the ring to the side plates, radially disposed apertures arranged in each side of the ring, rods slidably mounted in said apertures, ground engaging plates detachably secured to said rods and movable through the rim, each plate being secured to two rods, and means for operating said rods.

5. A traction wheel comprising hubs, side plates connected with the hubs and provided with oppositely disposed peripheral flanges forming the rim of the wheel and spacing the side plates apart, means detachably connecting said flanges together, a ring located between said side plates and arranged concentric with the flanges, means detachably securing the ring to the side plates, radially disposed apertures arranged in each side of the ring, rods slidably mounted in said apertures, ground engaging plates detachably secured to said rods and movable through the rim, each plate being secured to two rods, the side plates being provided with apertures near their peripheries to permit the plates to be detached from the rods without removing the rim or side plates, and means for operating said rods.

In testimony whereof I have signed my name to this specification.

HENRY HALLAM.